United States Patent
Takagi et al.

(10) Patent No.: US 6,389,348 B1
(45) Date of Patent: May 14, 2002

(54) CONTROL SYSTEM FOR VEHICLE HAVING CONTINUOUSLY VARIABLE TRANSMISSION

(75) Inventors: Isao Takagi, Okazaki; Zenichiro Mashiki, Nisshin; Hirofumi Kubota, Mishima; Hiroya Tanaka, Nishikamo; Shinichi Mitani, Toyota; Yasushi Ito, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/632,938

(22) Filed: Aug. 4, 2000

(30) Foreign Application Priority Data

| Aug. 5, 1999 | (JP) | ............................................ 11-223042 |
| Dec. 6, 1999 | (JP) | ............................................ 11-346902 |
| May 19, 2000 | (JP) | ........................................ 2000-149087 |

(51) Int. Cl.$^7$ .......................... B60K 41/00; F02D 29/00
(52) U.S. Cl. ............................. 701/58; 701/51; 701/54
(58) Field of Search ............................. 701/51, 54, 58; 477/37, 43, 109

(56) References Cited

U.S. PATENT DOCUMENTS

| 4,720,739 A | | 1/1988 | Watanabe et al. | |
| 4,735,114 A | * | 4/1988 | Satoh et al. | ................... 74/866 |
| 5,413,540 A | * | 5/1995 | Strieb et al. | ................... 477/43 |
| 5,658,217 A | | 8/1997 | Tsukada | |
| 6,027,425 A | * | 2/2000 | Sakaguchi et al. | ............. 477/48 |
| 6,066,070 A | * | 5/2000 | Ito et al. | ......................... 477/43 |
| 6,188,943 B1 | * | 2/2001 | Uchida et al. | ................. 701/54 |

FOREIGN PATENT DOCUMENTS

| EP | 0 510 590 | 10/1992 |
| EP | 0 895 006 | 2/1999 |
| EP | 0 953 469 | 11/1999 |
| JP | 62-110535 | 5/1987 |
| JP | 3-072867 | 11/1991 |
| JP | 10-329587 | 12/1998 |
| JP | 11-5460 | 1/1999 |
| JP | 11-078619 | 3/1999 |

OTHER PUBLICATIONS

Patent Abstracts of Japan, JP 62–110535, May 21, 1987.

* cited by examiner

*Primary Examiner*—Michael J. Zanelli
(74) *Attorney, Agent, or Firm*—Oblon, Spivak, McClelland, Maier & Neustadt, P.C.

(57) ABSTRACT

A target driving force is calculated by an ECU on the basis of an accelerator opening and a vehicle speed, and a rounded target driving force value (or a corrected target driving force), as gradually changed from the driving force, is determined in the course to reach the target driving force. On the other hand, a rounded target power value (or a corrected target power) is determined on the basis of the rounded target driving force value. Moreover, the gear ratio of a CVT is controlled according to a target power calculated on the basis of the target driving force, and the load on an engine is controlled on the basis of the rounded target power value, so that the reduction in the power characteristics or the physical discomfort, as might otherwise be caused by the difference in the response between the engine and the CVT, is loosened.

20 Claims, 13 Drawing Sheets

CONTROL SYSTEM FOR VEHICLE HAVING CONTINUOUSLY VARIABLE TRANSMISSION

BACKGROUND OF THE INVENTION

1. Field of the Invention

The present invention relates to a control system for a vehicle having a continuously variable transmission capable of changing a gear ratio continuously and, more particularly, to a control system for controlling a power source and a continuously variable transmission in parallel on the basis of an output demand.

2. Related Art

In the prior art, a continuously variable transmission (i.e., CVT) is known as a vehicular transmission. In short, this continuously variable transmission is a transmission having a function to change the ratio between an input speed and an output speed continuously. At present, there has been practically used a system which is constructed to set the gear ratio properly by continuously changing the radial position of a transmission member on an input side rotary member and the radial position of the transmission member on an output side rotary member. Specifically, there have been practiced the belt type continuously variable transmission and the toroidal type (or traction type) continuously variable transmission.

The former belt type continuously variable transmission is constructed such that an input pulley and an output pulley running over a belt are made of a fixed sheave and a movable sheave which is made movable in the axial direction, respectively, and such that the groove widths of the individual pulleys are changed by moving the movable sheaves of the individual pulleys axially thereby to change the belt winding diameters, i.e., the gear ratios continuously. By applying an axial force according to a demanded transmission torque to the movable sheave in the output side pulley, the tension of the belt is set to one according to the demanded torque. To the movable sheave of the input side pulley, on the other hand, there is applied the axial force for setting the gear ratio which is determined on the basis of an output demand signal based on the depression stroke (or the accelerator opening) of an accelerator pedal, an output demand signal from a cruise control for setting the vehicle speed automatically to a predetermined value, and a running state such as the vehicle speed, thereby to change the groove width of the input side pulley.

Thus according to the continuously variable transmission, the gear ratio can be continuously changed to change the speed of the power source such as an engine freely. In the vehicle mounting the continuously variable transmission thereon, therefore, the gear ratio can be controlled not only to satisfy a demanded driving torque but also to run the power source efficiently, i.e., to reduce the fuel consumption.

One example of this control is disclosed in Japanese Patent Publications Nos. 3-72867 (JP-B-3-72867) and 62-110535 (JP-A-62-110535). In this control, firstly a target driving force is determined from the depression stroke of the accelerator pedal and the vehicle speed. Next, a target power, a throttle opening and a target engine speed corresponding to the target driving force are individually determined, and a target gear ratio of the continuously variable transmission is then determined on the basis of the target engine speed and the vehicle speed. Moreover, the engine is controlled to generate a target torque determined on the basis of the target power and the engine speed, whereas the continuously variable transmission is controlled to set a gear ratio for the most efficient engine speed for achieving the target power.

However, the engine and the continuously variable transmission are different in their responses to the control. Specifically, the engine is enabled to change the torque immediately after the intake air and the fuel supply are increased, but the continuously variable transmission takes a considerable time until the target gear ratio is achieved, because the gear ratio is changed by gradually increasing/decreasing the groove widths of the pulleys by the hydraulic control. In response to the depression stroke of the accelerator pedal, however, the target driving force is changed, and the target power is changed. On the other hand, the engine torque is determined by the calculation of (the target power/the engine speed). If the engine speed is brought in a low state due to a delay in the speed change of the continuously variable transmission, the engine torque, as determined by the calculation of (the target power/the engine speed), abruptly rises, and an acceleration shock may occur. Due to an abrupt change in the torque, on the other hand, a torsional deformation may occur in a power transmission line to cause the longitudinal vibration (or the surging) of the vehicle.

When a torque converter is employed in the starting system of the vehicle having the continuously variable transmission, on the other hand, the driving torque at the start may become excessively high. In the fluid type torque converter, for example, a torque amplifying action occurs in a converter region where the ratio (i.e., the speed ratio) between the input speed and the output speed is smaller than "1", the torque to be outputted from the torque converter increases. At the start, the output speed is substantially zero so that the torque ratio or the torque amplification factor takes the maximum value. As a result, the aforementioned controls of the power source and the continuously variable transmission might make the driving torque excessive at the start. In this case, an abrupt acceleration feeling might be given to passengers of the vehicle, or the tire slip might be invited when a road surface has a low $\mu$ (i.e., friction coefficient) (as on a pressed-snow road, a frozen road or a gravel road). The torque converter as the starting system basically performs the action to augment the starting torque, as described above, so that a similar situation occurs even if the torque converter is not of the fluid type.

In order to eliminate this disadvantage, it is conceivable to perform the so-called "rounding control", in which the target driving force according to the depression stroke of the accelerator pedal is reached, even if calculated, not instantly but gradually. With the control based on the target value which is corrected in the rounding control or set temporarily, the abrupt change in the torque is avoided to eliminate the shock. However, the rounding control delays the achievement of a final target value by reducing the corrected target value so that the control response is deteriorated. If the gear ratio of the continuously variable transmission is controlled on the basis of the target value by the rounding control, on the other hand, the target value of the gear ratio is gradually changed so that the speed changing rate of the continuously variable transmission cannot be maximized. As a result, the intrinsically inferior shift response becomes worse to cause a problem that the physical discomfort for driving the vehicle becomes more serious.

SUMMARY OF THE INVENTION

A main object of the present invention is to provide a control system capable of improving the responses of an engine and a continuously variable transmission and the power characteristics of the vehicle and capable of controlling the vehicle without any physical discomfort.

For this object, therefore, the control system of the invention is so constructed for controlling the power source and the continuously variable transmission to a target value based on an acceleration demand, as to make either a correction only for the target value of one of the power source and the continuously variable transmission or a correction different from that for the target value of the other.

According to the invention, specifically, there is provided a control system for a vehicle including: a power source; and a continuously variable transmission capable of changing gear ratios continuously, wherein a target driving force is calculated on the basis of an acceleration demand and a vehicle speed, and a target power of the power source is calculated on the basis of the target driving force, so that the continuously variable transmission may be controlled to achieve the target power, and wherein a target torque of the power source is calculated on the basis of the target driving force so that the power source is controlled to achieve the target torque. This control system comprises corrected target torque calculating means for determining a corrected target torque changing in the course to reach the target driving force, while being suppressed more than the change of the target torque. The control system is constructed such that the gear ratio of the continuously variable transmission is controlled on the basis of the target power and the load on the power source is controlled on the basis of the corrected target torque.

The corrected target torque calculating means can be constructed to include means for determining a corrected target driving force changing while being suppressed more than the change of the target driving force, to calculate the corrected target torque on the basis of the corrected target driving force.

On the other hand, the corrected target torque calculating means can be constructed to include means for determining a corrected target power changing while being suppressed more than the change of the target power, to calculate the corrected target torque on the basis of the corrected target power.

Moreover, the corrected target torque calculating means can be constructed to include means for calculating the corrected target torque on the basis of the target torque.

In any of the foregoing constructions, moreover, the corrected target torque calculating means can be constructed to include means for calculating the corrected target torque so that the change in the corrected target torque may be restricted for a predetermined period in the course of the change.

The controls for determining the individual corrected values of the target torque, the target driving force and the target power are similar to the aforementioned rounding controls. In the continuously variable transmission, therefore, the shift controls are quickly performed with the target power which changes instantly on the basis of the acceleration demand, whereas in the power source, the gently changing controls are made with the rounded target power value, so that an abrupt torque generation is avoided. As a result, the acceleration shock at the time of quickly opening an accelerator can be reduced while keeping the response of the continuously variable transmission proper, so that the vehicle can be controlled without any physical discomfort.

In any of the foregoing constructions, still moreover, the corrected target torque calculating means can be constructed to include means for calculating the corrected target torque by making the suppression degree of the change in the corrected target torque the lower for the larger acceleration demand or the larger control parameter determined from the acceleration demand.

In any of the foregoing constructions, on the contrary, the corrected target torque calculating means can be constructed to include means for calculating the corrected target torque by making the suppression degree of the change in the corrected target torque the lower for the higher changing rate of the acceleration demand or the higher changing rate of a control parameter determined from the acceleration demand.

With this construction, therefore, the degree of suppressing the change in the corrected target torque is set to compensate the torque loss corresponding to the inertia torque, as caused by the rotational change accompanying the acceleration demand. This suppression degree is determined on the basis of the acceleration demand or a control parameter based thereon, or their changing rate, so that the correction of the target torque compensating the inertia loss torque is not fluctuated by the disturbances. As a result, it is possible to prevent the fluctuation of the output torque and the surging, as caused by the fluctuation. On the other hand, the suppression degree is lowered, as the inertia torque is raised. Specifically, as the acceleration demand or a control parameter based thereon, or their changing rates are raised, the change ratio of the corrected target torque is increased, so that the delay in the rotational change due to the inertia force can be prevented to effect the speed change having a high response.

According to the invention, on the other hand, there is provided a control system constructed to comprise lower limit restricting means for restricting a calculating speed of the target torque of the power source to a predetermined lower limit, at least in a portion of a converter region in which a torque converter amplifies the torque and to calculate the target torque on the basis of the calculation speed restricted to the lower limit.

Here, the lower limit is exemplified by 900 rpm.

In the control system of the invention, moreover, the control system is constructed to comprise upper limit restricting means for restricting the target torque to a predetermined upper limit according to an acceleration demand, at least in a portion of a converter region in which the torque converter amplifies the torque and to control a load on the power source on the basis of the target torque restricted to the upper limit.

Here, the upper limit of the target torque can be set by using a value which is prepared in advance in relation to the accelerator opening, such as a correlation map.

According to the control system of the invention, therefore, an excessive torque can be prevented from being generated in the converter region, without being influenced by the target power based on the target driving force or the speed of the power source, so that the abrupt acceleration feeling at the start or the tire slip or the like on the low $\mu$ road can be prevented to control the vehicle without any physical discomfort.

The above and further objects and novel features of the invention will more fully appear from the following detailed description when the same is read with reference to the accompanying drawings. It is to be expressly understood, however, that the drawings are for the purpose of illustrations only and are not intended as a definition of the limits of the invention.

DETAILED DESCRIPTION OF THE PREFERRED EMBODIMENTS

Figure 1:
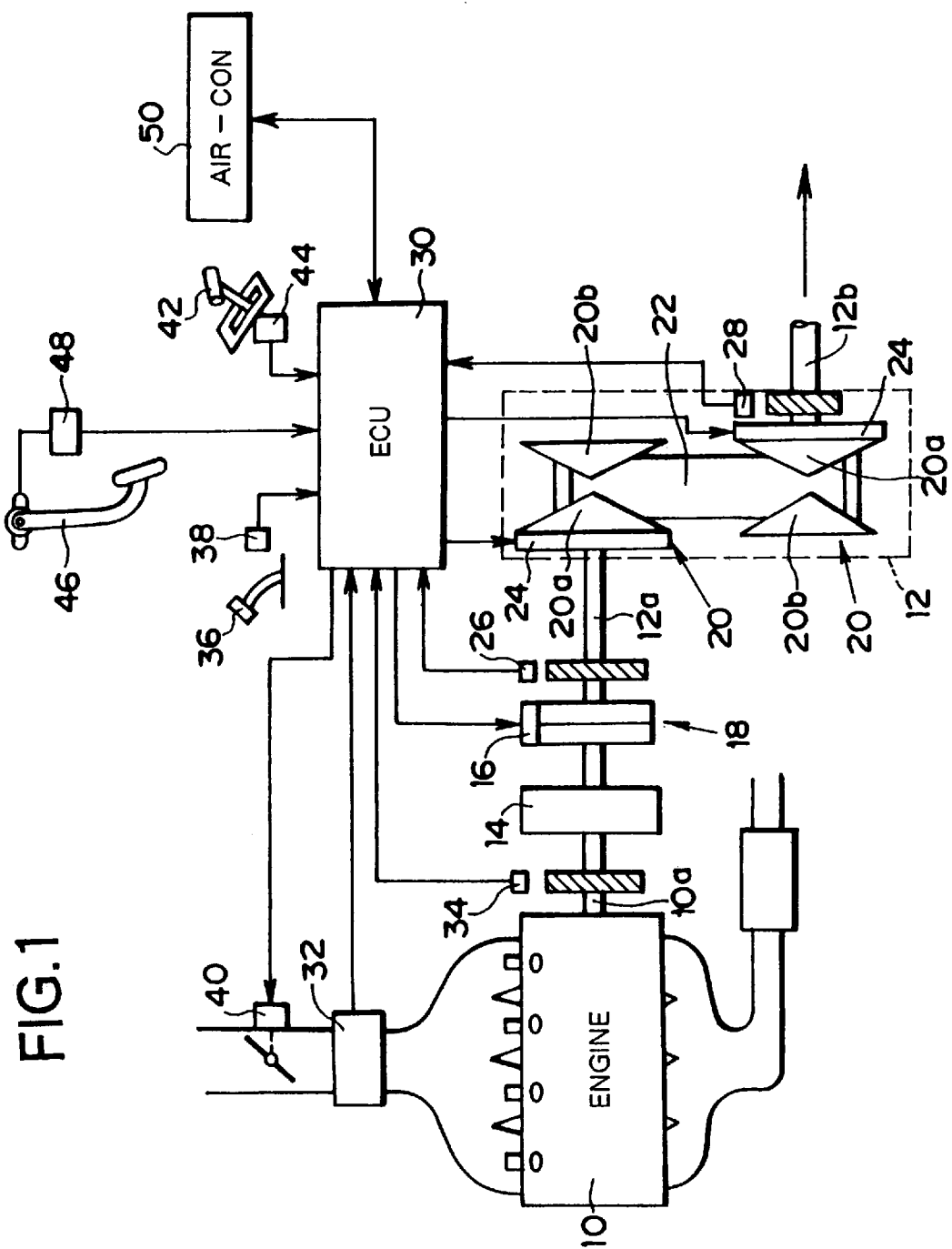
FIG. 1 is a conceptional diagram showing a schematic construction of a vehicle provided with a control system according to the invention.

The invention will be described in connection with its specific example with reference to the accompanying drawings. FIG. 1 shows a conceptional diagram of a vehicle according to the invention. In the shown vehicle, a continuously variable transmission (as will be shortly referred to as the "CVT") 12 is arranged between a power source and (not-shown) driving wheels. Here, the power source is exemplified by an internal combustion engine such as a gasoline engine or a Diesel engine, an electric motor such as a motor, or a combination of those. The following description will be made by employing an engine 10.

In FIG. 1, the engine 10 has a crankshaft 10a connected to an input shaft 12a of the belt-type CVT 12 through a torque converter 18 including a forward/backward switching mechanism 14 and a lockup clutch 16. On the other hand, an output shaft 12b of the CVT 12 is connected through a not-shown differential gear mechanism to the driving wheels of the vehicle. Moreover, a lockup clutch 16 is mechanically connected to transmit torque of the engine 10 to the driving wheels or vice versa. When the lockup clutch 16 is disconnected (or released), on the other hand, the engine 10 and the driving wheels (or the CVT 12) become independent (although fluid-coupled by the torque converter 18), and the engine 10 can be autonomously driven without receiving no excessive load from the driving wheels so that it can keep the idling rotation, for example.

The CVT 12, as shown in FIG. 1, is enabled to change the gear ratio by hydraulically changing the groove width of a pair of variable pulleys 20 composed of a movable rotor (or a movable sheave) 20a and a fixed rotor (or a fixed sheave) 20b, thereby to change the winding radius of a belt 22 on those variable pulleys 20 while keeping the tension of the belt 22 constant. Thus, the change rate of the groove width is the speed changing rate. Specifically, an actuator 24 for driving the movable sheave 20a of the variable pulleys 20 on the output side is supplied with an oil pressure based on the information of the transmission input torque such as a throttle opening, to set the tension of the belt 22 to a value corresponding to the input torque. In this state, a line pressure to be supplied to and discharged from the actuator 24 for driving the movable sheave 20a of the input side variable pulleys 20 is controlled so that the speed changing rate can be voluntarily controlled. Here in the invention, there can be used not only the belt type CVT thus far described but also a toroidal type continuously variable transmission which is enabled to change the gear ratio by sandwiching power rollers between a pair of discs having toroidal faces and by inclining the power rollers to change the radii of their points of contact with the discs.

On the other hand, the torque converter 18 is basically provided for activating the engine 10 continuously even when the vehicle stops. Here, the forward/backward switching mechanism 14 is provided partly because the rotating direction of the engine 10 is limited to one direction and partly because the CVT 12 is not equipped with a reversing mechanism. The forward/backward switching mechanism 14 can be exemplified by a mechanism constructed mainly of a planetary gear mechanism or a mechanism equipped with a reverse gear and a synchronous coupling mechanism.

For detecting the rotating speeds of the input shaft 12a and the output shaft 12b, respectively, there are provided speed sensors 26 and 28. These speed sensors 26 and 28 are connected with an electronic control unit (as will be shortly referred to as the "ECU") 30 which is constructed mainly of a microcomputer. This ECU 30 calculates the gear ratio of the CVT 12 on the basis of the detected signals of the speed sensors 26 and 28.

In the vicinity of an intake pipe of the engine 10, on the other hand, there is disposed an intake pressure sensor 32 for detecting the intake pressure. In the vicinity of the crankshaft 10a, there is disposed a rotation sensor 34 for detecting the engine speed. The ECU 30 controls the fuel injection rate and the ignition timing to the optimum according to the intake pressure detected by the intake pressure sensor 32 and the engine speed detected by the rotation sensor 34.

In the vicinity of an accelerator pedal 36, on the other hand, there is disposed an acceleration sensor 38 for detecting the accelerator opening (as defined in terms of the depression stroke of an accelerator pedal), and the detected accelerator opening is fed to the ECU 30. The ECU 30 employs the accelerator opening detected by the acceleration sensor 38, the vehicle speed detected by the speed sensor 28 and the engine speed detected by the rotation sensor 34 to control the intake pressure through a throttle actuator 40 so that the fuel economy may be optimized, for example.

On the other hand, a shift lever 42, as disposed in the vicinity of the driver's seat, is equipped with a shift sensor 44 for detecting the shift position of the shift lever 42. Using the information such as the drive range, as detected by the shift sensor 44, the vehicle speed and the accelerator opening, the ECU 30 controls the action of the lockup clutch 16 and the gear ratio of the CVT 12.

In the vicinity of a brake pedal 46, moreover, there is disposed a brake pedal sensor 48 for detecting the depression stroke and rate of the brake pedal 46. The brake pedal sensor 48 is arranged at a (not-shown) brake pedal bracket to feed a voltage which is proportional to the depression stroke of the brake pedal 46 to the ECU 30.

On the other hand, this ECU 30 is connected with an accessory such as air conditioner (as will be shortly referred to as the "air-con") 50 thereby to control it. This air-con 50 has a (not-shown) compressor driven by the engine 10.

This embodiment is characterized in that in the course to a target driving force calculated on the basis of the accelerator opening and the vehicle speed, the target driving force is rounded by changing the driving force gradually so that a rounded target power is determined on the basis of the rounded target driving force. Further characterized is that the gear ratio of the CVT 12 is controlled on the basis of the target power of the engine 10, as calculated for the target driving force whereas the load on the engine 10 is controlled on the basis of the rounded target power.

Figure 2:
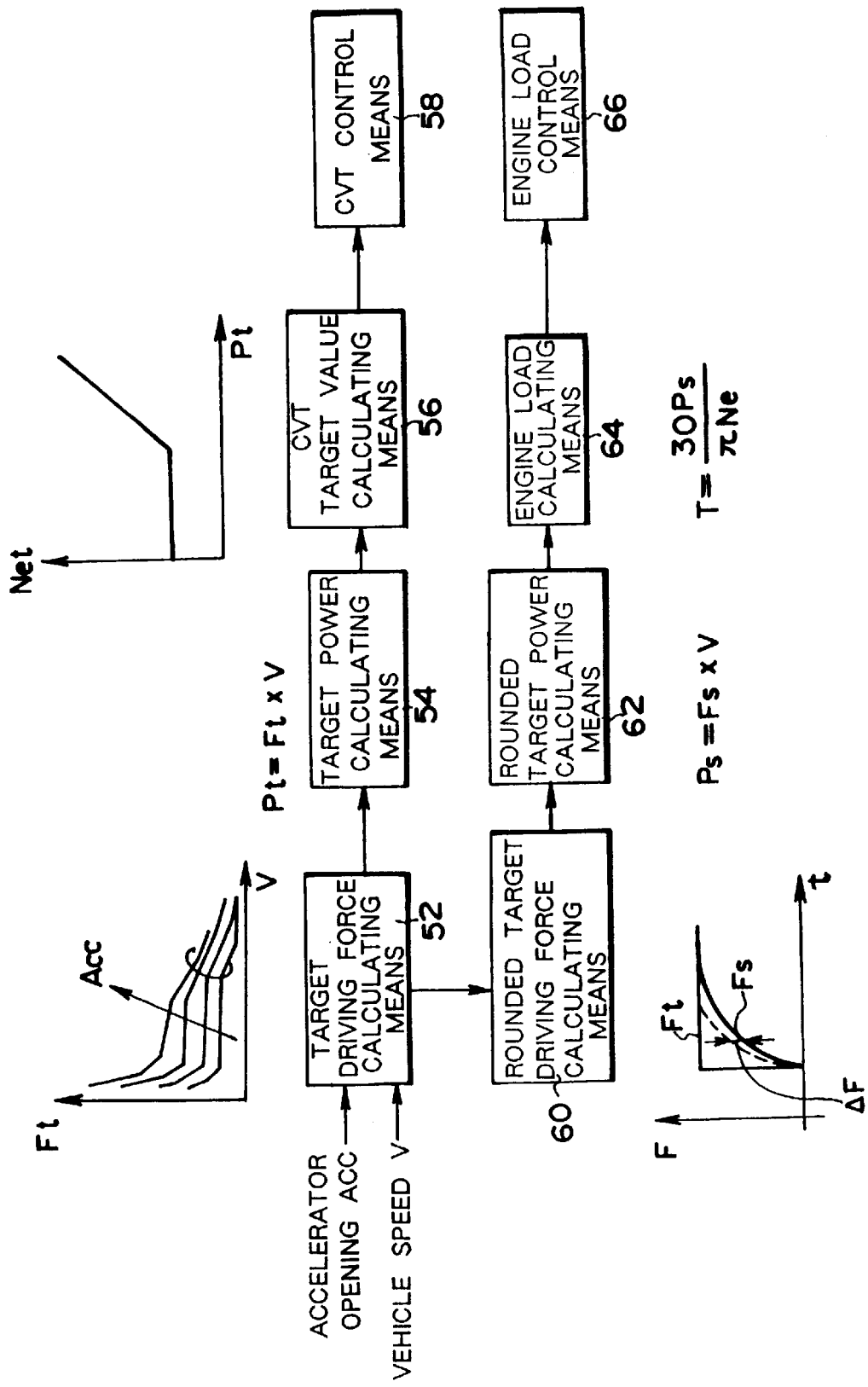
FIG. 2 is a block diagram for explaining a processing routine in the control system according to the invention.

FIG. 2 is a block diagram for explaining the control routine of a first embodiment in the ECU 30. Target driving force calculating means 52 in the ECU 30 determines a target driving force Ft on the basis of the accelerator opening Acc and the vehicle speed V, as inputted thereto. Here, the accelerator opening Acc is the control data which are obtained by electrically detecting the depression stroke of the accelerator pedal 36 with the acceleration sensor 38, and is used as a demand for an acceleration or deceleration, i.e., a demand parameter for the driving force. Therefore, an acceleration demand signal for a cruise control to keep the vehicle speed constant may be employed in place of the accelerator opening Acc. This substitution also applies to an input value concerning the vehicle speed. Specifically, a value relating to the vehicle speed, i.e., another input signal having a one-to-one relation to the vehicle speed V, such as a speed obtained from a rotating portion can be converted and used as the vehicle speed V. The target driving force Ft can be deduced from the map which illustrates relations between the vehicle speed V and the driving force Ft, using the accelerator opening Acc as the parameter, as illustrated in FIG. 2. This map is prepared in advance for each vehicle or engine.

Subsequently, target power calculating means 54 determines a target power Pt of the engine 10 by multiplying the acquired target driving force Ft and the current vehicle speed V. Moreover, CVT target value calculating means 56 in the ECU 30 determines a target engine speed Net corresponding to the target power Pt, so as to control the gear ratio of the CVT 12. Here may be determined a target input shaft speed Nint corresponding to the target power Pt. This target engine speed Net or target input shaft speed Nint can also be extracted from the correlation map based on the target power Pt.

Moreover, CVT control means 58 in the ECU 30 controls the gear ratio of the CVT 12 on the basis of the target engine speed Net and a detected actual engine speed Ne so that the actual engine speed may become the target engine speed. In FIG. 1, more specifically, a control is made on the line pressure to be supplied to and discharged from the actuator 24 for driving the movable sheave 20a of the variable pulleys 20. In short, the gear ratio of the CVT 12 is quickly controlled to achieve the target power according to the target driving force which changes as the accelerator pedal 36 is depressed.

For the target driving force Ft determined by the target driving force calculating means 52, on the other hand, rounded target driving force calculating means 60 in the ECU 30 calculates a rounded target driving force Fs by changing the driving force gradually in the course to reach the target driving force Ft. The rounded target driving force value Fs can be calculated with the following rounding formula by 1/n:

$$Fs(i)=Ft/n+(n-1) \cdot Fs(i-1)/n.$$

The change in the rounded target driving force value Fs relative to the target driving force Ft is illustrated in FIG. 2, for example. For this rounded target driving force value Fs, there may be prepared and extracted such correlation map. On the other hand, the change in the rounded target driving force value Fs need not always be so smooth, as illustrated in FIG. 2, but may be stepwise changed, for example, by limiting the increase or decrease by a predetermined value for each calculation period.

Subsequently, rounded target power calculating means 62 in the ECU 30 determines a rounded target power value Ps of the engine 10 by multiplying the acquired target driving force Ft and the current vehicle speed V. In order to control the engine 10, moreover, engine load calculating means 64 in the ECU 30 determines a target engine torque T from the following formula on the basis of the rounded target power value Pt and the current engine speed Ne. Here, the current input shaft speed Nin may be employed in place of the current engine speed Ne.

$$T=30Ps/\pi Ne.$$

Engine load control means 66 in the ECU 30 controls the engine 10 to output the calculated target engine torque T. Specifically, the engine load control means 66 controls the fuel injection rate or the opening of the (not-shown) electronic throttle valve. At this time, the rounded target power value Ps, as rounded with respect to the target driving force Ft, is used for calculating the target engine torque T, so that an abrupt change in the torque can be avoided to prevent any shock from occurring at the time of operating the accelerator pedal 36.

Thus, the gear ratio control of the CVT 12 is made on the basis of the target power, and the load control of the engine 10 is made on the basis of the rounded target power value. Considering the difference between the response of the engine 10 and that of the CVT 12, it is possible to improve the vehicle control without any physical discomfort while improving the power characteristics of the vehicle, that is, the acceleration response (i.e., the shift response of the CVT) while reducing the acceleration shock.

Figure 3:
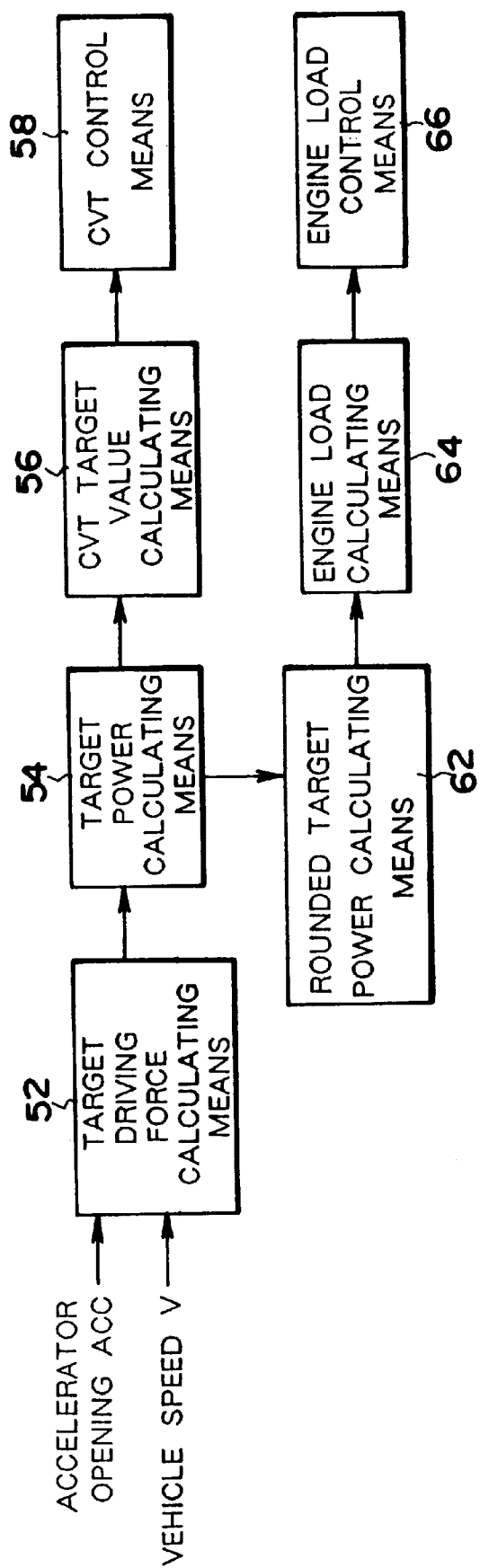
FIG. 3 is a block diagram for explaining another processing routine in the control system according to the invention.

Here in the aforementioned specific example, the target driving force Ft is corrected by the rounding operation to correct the target torque but may be corrected by correcting the target power or the target torque by rounding it. For example, FIG. 3 shows a modification of the construction of FIG. 2, in which the rounded target power calculating means 62 calculates the rounded target power value Ps on the basis of the target power Pt calculated by the target power calculating means 54. This calculation can be made, with a similar effect, by applying the aforementioned rounding formula by 1/n. On the other hand, the engine load calculating means 64 can be further provided with a function to round the target engine torque T calculated on the basis of the target power Pt, thereby to obtain a similar effect.

In the vehicle having the CVT 12 mounted thereon, as shown in FIG. 1, there is employed the torque converter 18 for allowing the engine 10 to run idly while the vehicle stops or runs at a low speed, and for increasing the driving torque when the vehicle starts. The torque converter 18 synchronizes the engine 10 and the CVT 12 which are in different rotation states by lowering the applying force of the lockup clutch 16 to cause a slip at the stop or at the low-speed run (just after the start or just before the stop), and separates the engine 10 and the CVT 12 at the stop by releasing the lockup clutch 16 completely. When the vehicle speed increases, on the other hand, the torque converter 18 connects the engine 10 and the CVT 12 directly by applying the lockup clutch 16, thereby to effect the power transmission in between efficiently.

Figure 4:
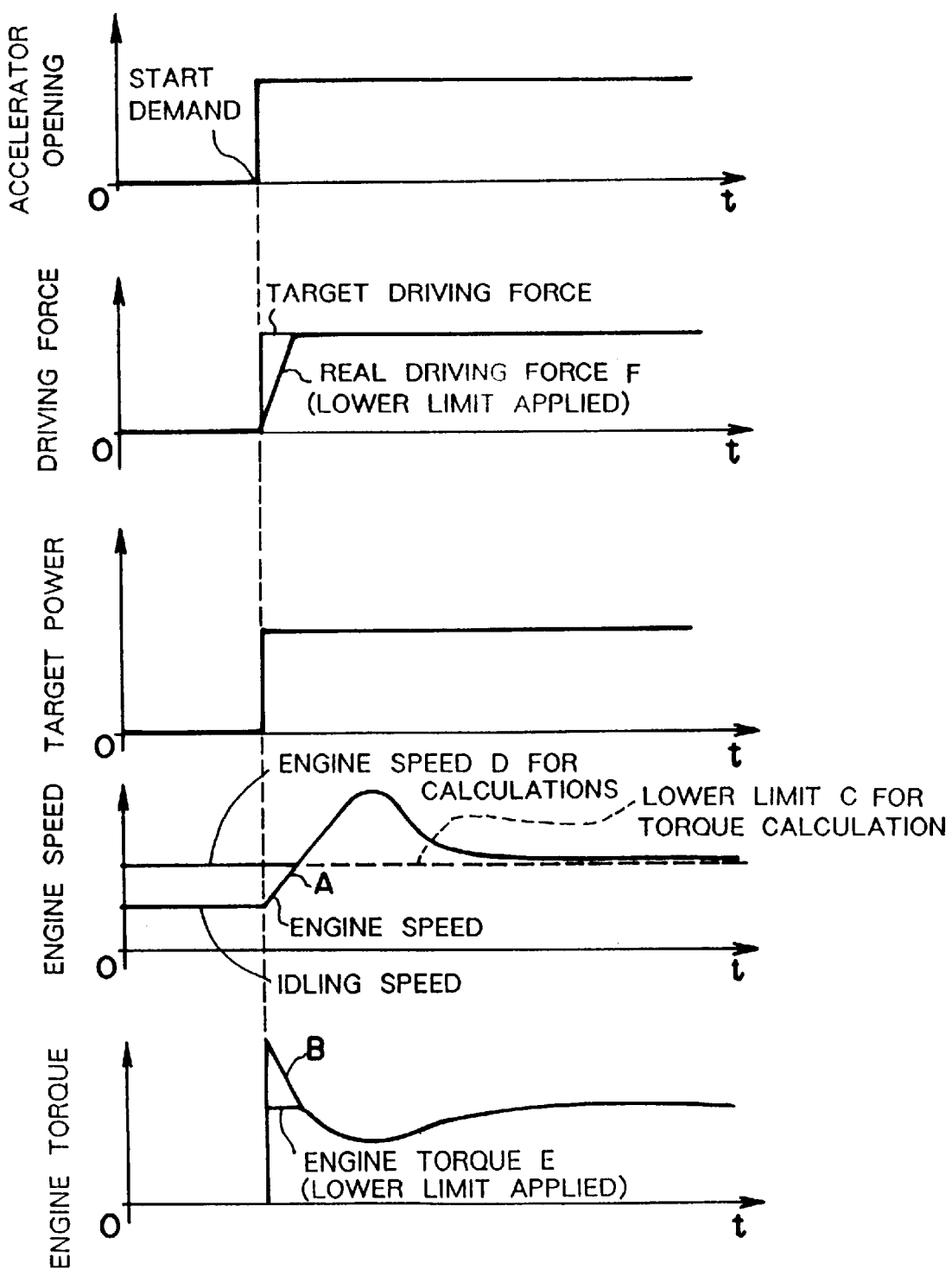
FIG. 4 is an explanatory diagram for explaining changes in an accelerator opening, a driving force, a target power, an engine speed and an engine torque in a torque converter acting region in the control system according to the invention.

As described above, the engine 10 is controlled to generate the engine torque, as determined from the target power calculated on the basis of the depression of the accelerator pedal and from the engine speed or the input shaft speed, that is, the engine torque according to the acceleration demand. FIG. 4 illustrates the changes in the accelerator opening, the driving force, the target power, the engine speed and the engine torque of the converter region at the starting time when the connection of the lockup clutch 16 is started to increase the engine speed. In the control of the prior art, when the accelerator opening is decided with the start demand, the target drive power and the target power are calculated according to the accelerator opening. At this time, the engine speed increases from that of the idling state (as indicated by an engine speed A). Specifically, the engine torque at the start is calculated on the basis of the idling speed so that a high torque is generated at the start (as indicated by an engine torque B). This high torque is further augmented by the torque amplifying action of the torque converter 18. As a result, an abrupt acceleration may be caused on the ordinary road surface (as experienced in the dry state). When the vehicle runs on a road having a surface of a low $\mu$ (i.e., friction coefficient) such as a pressed-snow road, a frozen road or a graveled road, the tire slip may be invited.

As described hereinbefore, the target power at the control starting time is also rounded (or corrected) by controlling the gear ratio of the CVT 12 on the basis of the target power and by controlling the load on the engine 10 on the basis of the rounded target power value, so that the abrupt rise in the torque at the start can be avoided. Alternatively, the abrupt torque rise at the start can also be avoided by giving a lower limit to the calculative engine speed or input shaft speed at the time of calculating the engine torque.

As illustrated in FIG. 4, for example, the engine speed is set with a lower limit C (e.g., 900 rpm) for the torque calculations. As a result, a torque calculating engine speed D is kept more than the lower limit C. Even if the accelerator pedal 36 is depressed for starting the vehicle, moreover, a value more than the lower limit C is used at all times for calculating the actual engine torque. As a result, any abrupt rise in the engine torque at the start is suppressed, as indicated by an engine torque E of FIG. 4 at the time when the lower limit is applied. As indicated by an actual driving force F when the lower limit is applied, moreover, the actual driving force rises smoothly. As a result, the vehicle can be smoothly started without inviting the tire slip even if it runs on the low $\mu$ road, so that the vehicle control can be made without any physical discomfort.

Figure 5:
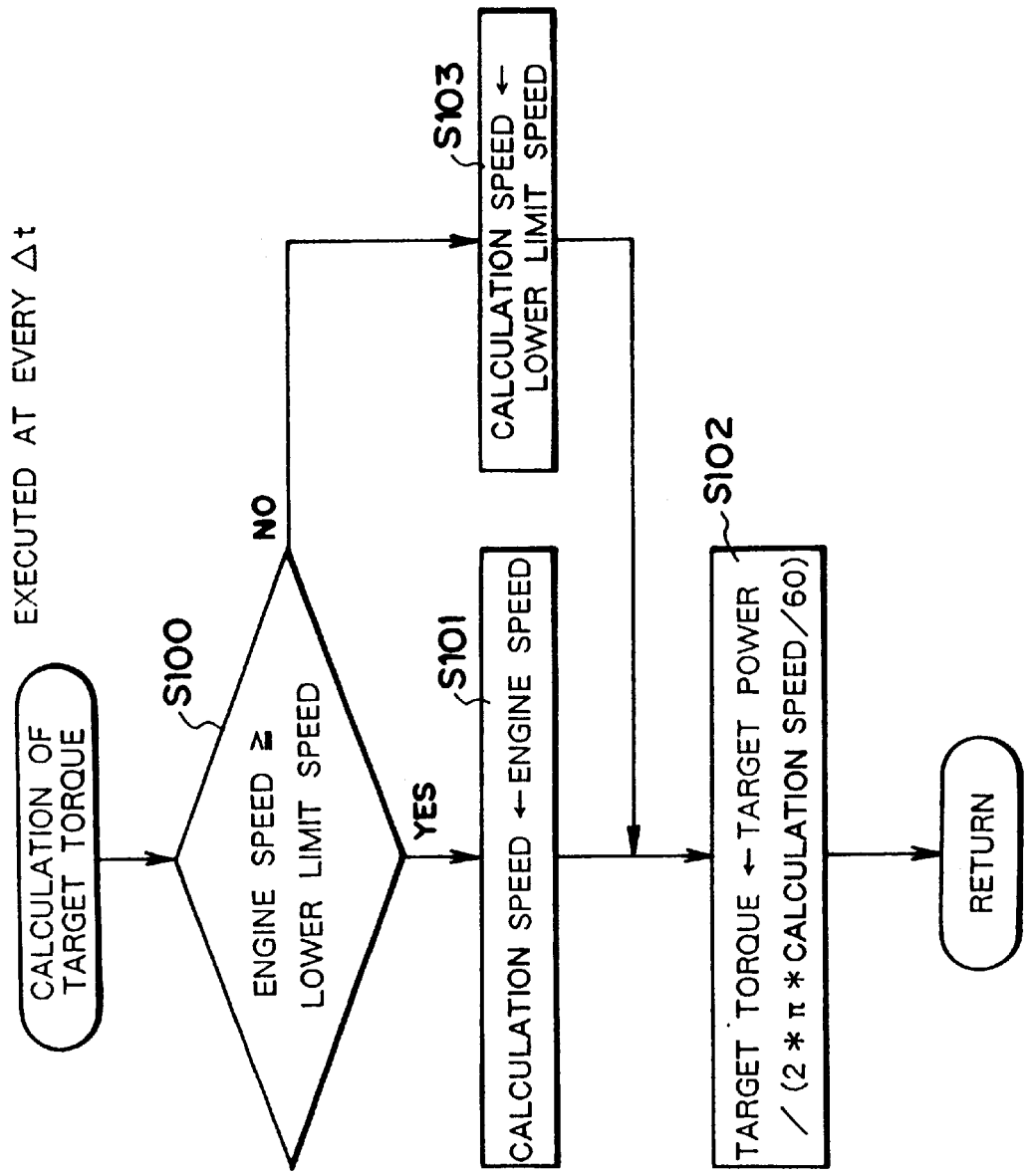
FIG. 5 is a flow chart for explaining a target torque calculating routine in the control system according to the invention.

FIG. 5 is a flow chart showing a routine for calculating the target torque on the basis of the engine speed. First of all, the ECU 30 of FIG. 1 compares the current engine speed with a preset lower limit (e.g., 900 rpm) (at Step S100). If the ECU 30 decides (the current engine speed≧the lower limit speed), the engine speed, as can be detected from the rotation sensor 34, is adopted as the speed for the torque calculations (at Step S101), and the target torque is calculated on the basis of the detected actual engine speed (at Step S102).

If the ECU 30 decides at Step S100 that (the current engine speed<the lower limit speed), the torque to be determined by the calculations may be excessive. Therefore, the preset lower limit speed (e.g., 900 rpm) is adopted as the speed for the torque calculations (at Step S103), and the calculations of the target torque are executed on the basis of the lower limit speed (at Step S102). As a result, the abrupt rise of the torque from the idling state is loosened, as illustrated in FIG. 4, to prevent the abrupt acceleration feeling and the tire slip at the start.

Figure 6:
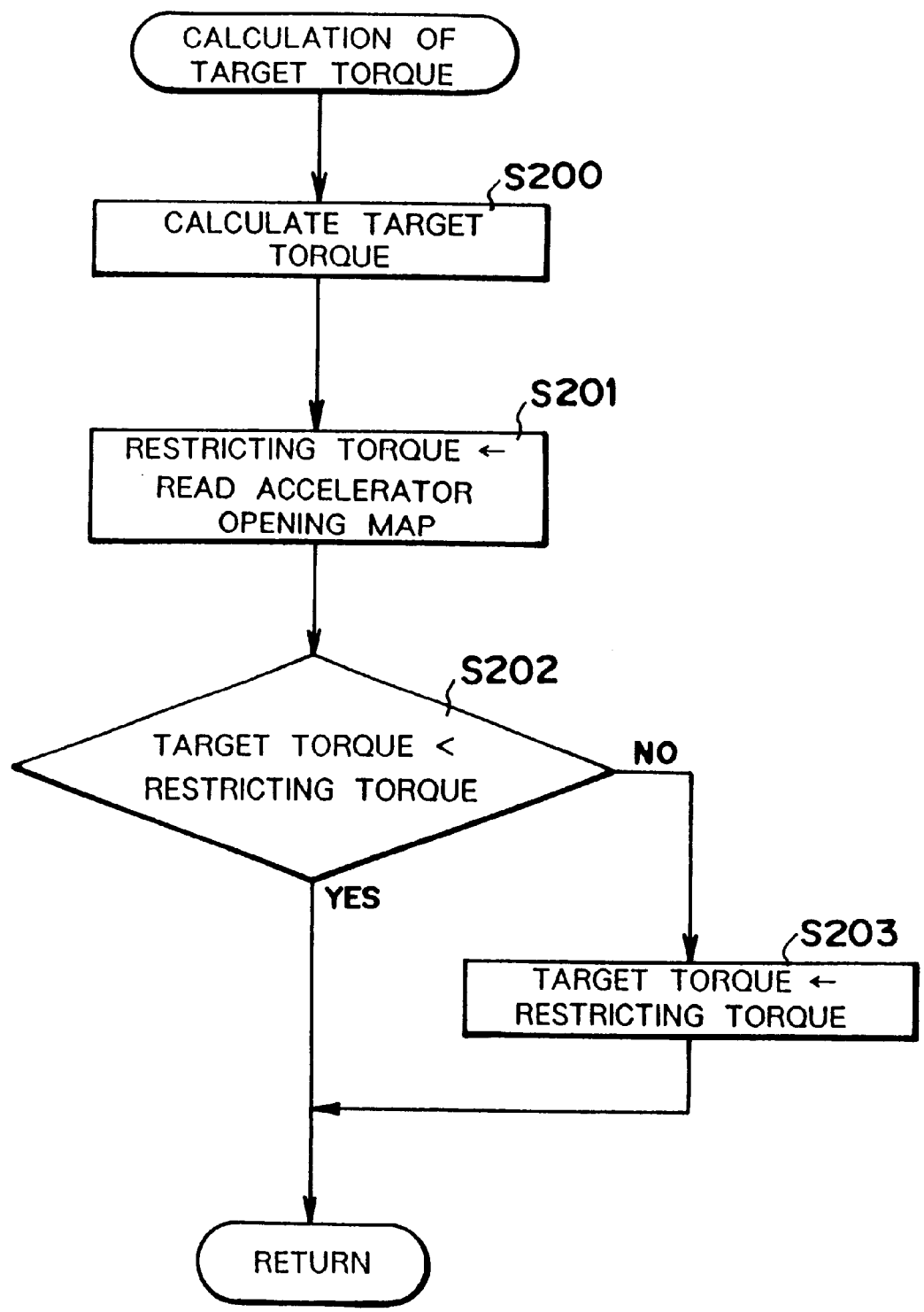
FIG. 6 is a flow chart for explaining another target torque calculating routine in the control system according to the invention.

As shown in the flow chart of FIG. 6, the torque to be actually generated may be restricted with the restricting torque which is determined on the basis of the accelerator opening. First of all, the target torque of the engine 10 is calculated on the basis of the accelerator opening (at Step S200). Simultaneously with this, the restricting torque is extracted from the correlation map which has been prepared in advance in relation to the accelerator opening (at Step S201). Then, the target torque and the restricting torque are compared (at Step S202). If the target torque is lower than the restricting torque (i.e., the target torque the restricting torque), the target torque, as calculated at Step S200, is adopted, and the control of the engine 10 is executed. If the target torque is higher than the restricting torque (i.e., the target torque<the restricting torque), on the contrary, the restricting torque is adopted as the target torque (at Step S203), and the control of the engine 10 is executed. As a result, a restriction is imposed upon the abrupt rise in the torque from the idling state, as in the example of FIG. 5, so that the tire slip and the abrupt acceleration feeling at the start are prevented.

Figure 7:
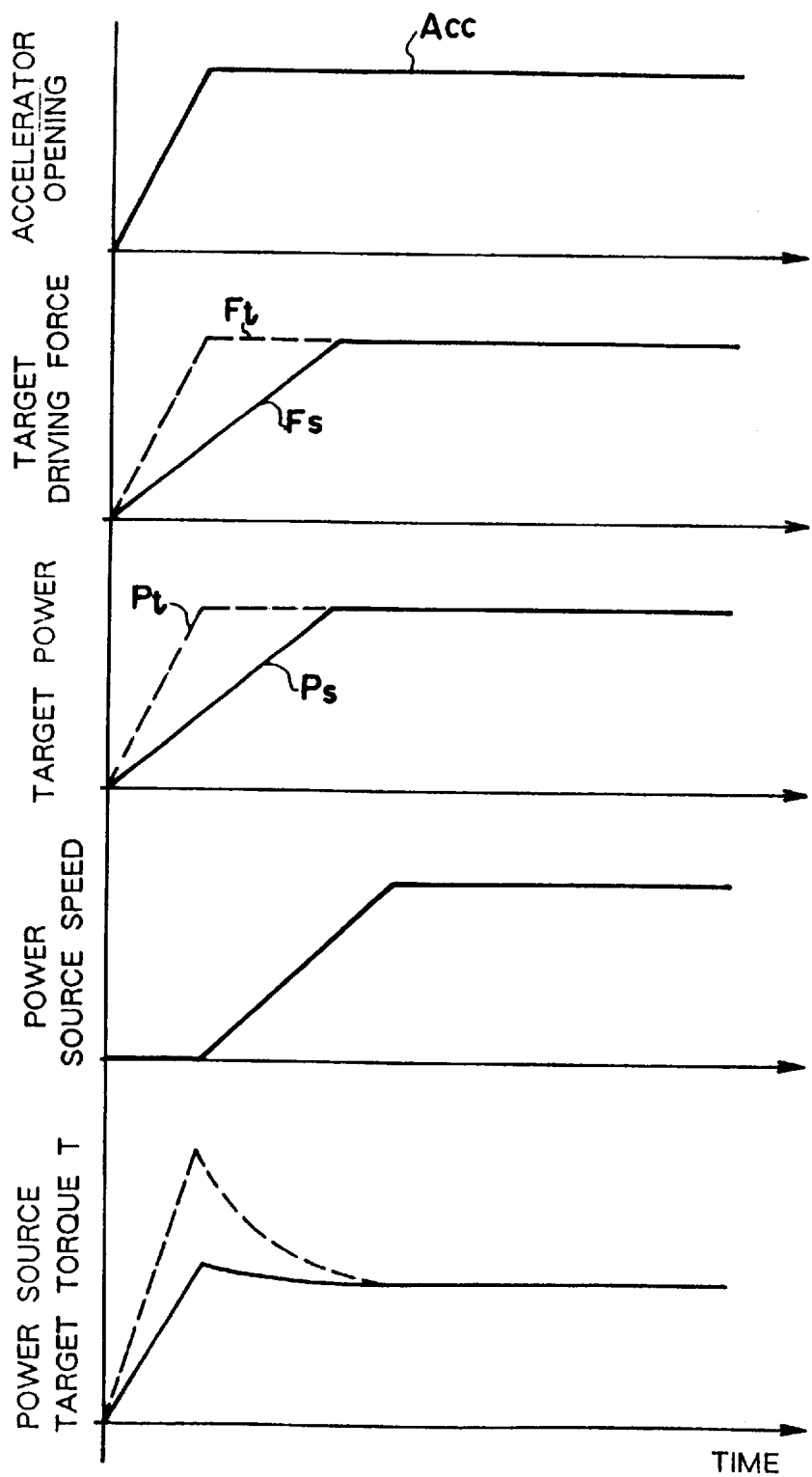
FIG. 7 is a time chart illustrating changes in a target driving force, a target power, a power source speed and a target torque according to one embodiment of the invention.

In the specific example thus far described, the target driving force, the target power or the target torque is corrected by rounding it. Alternatively, however, the changing tendency of the corrected target driving force, the corrected target power or the corrected target torque may be kept substantially constant. This alternative control is schematically illustrated in FIG. 7. This control aims mainly at the correction of an abrupt change in the driving force, as caused on the basis of the difference between the control response of the power source such as the engine and the shift response of the continuously variable transmission.

Even if the control response of the engine 10 is higher than the shift response of the CVT 12, however, there is such an unavoidable delay in the engine 10 itself as is exemplified by a delay in the increase of the suction corresponding to the increase in the throttle opening. In the drive train, on the other hand, there is a backlash which is based on the clearance in the joint portion between members. The backlash may cause a delay in the change of the driving torque. Considering these factors for the delay, the invention could be constructed to control the power source including the aforementioned engine 10 and the CVT 12, as will be explained in the following.

Figure 8:
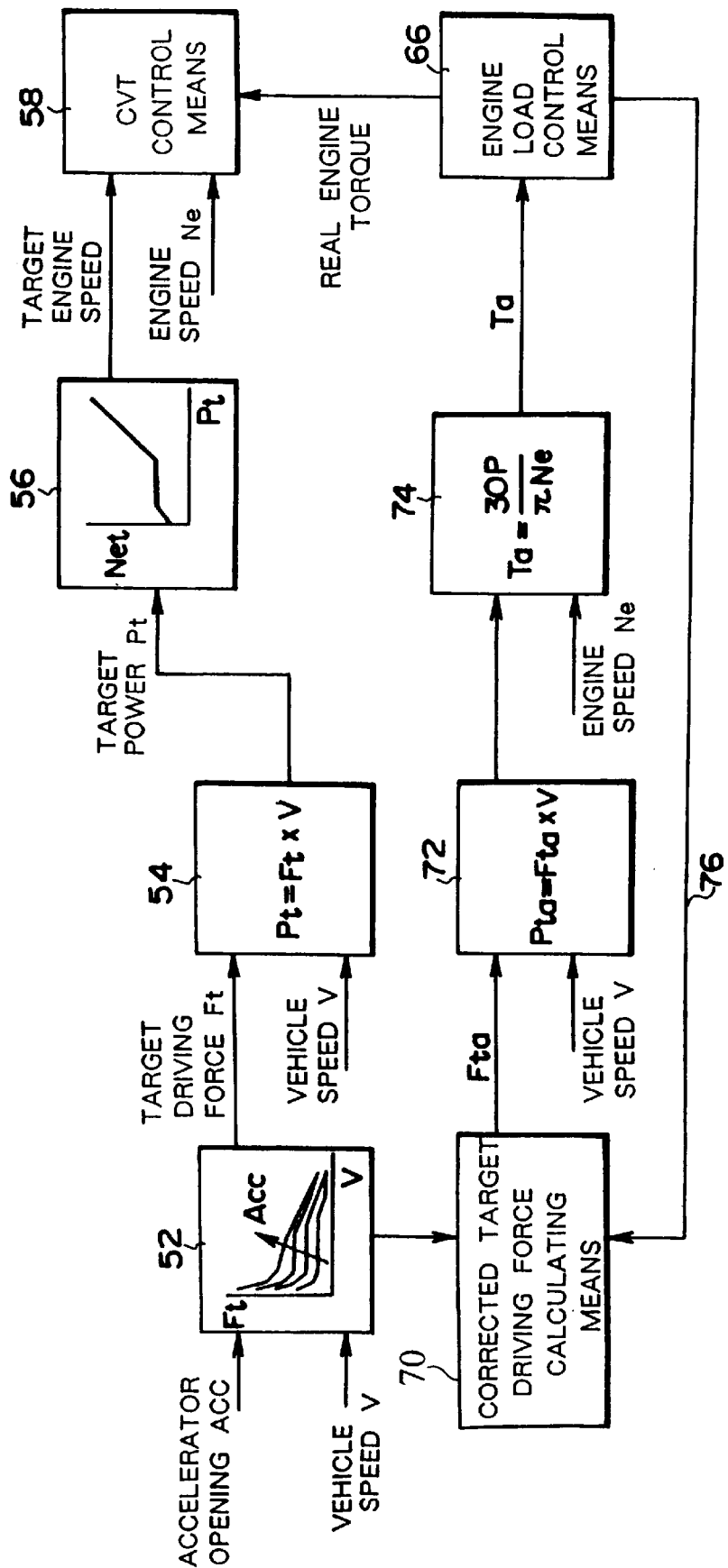
FIG. 8 is a block diagram for explaining a control system of another embodiment of the invention.

In FIG. 8, the target driving force calculating means 52, the target power calculating means 54, the target gear ratio calculating means 56 of the continuously variable transmission (CVT), and the CVT control means (or gear ratio control means) 58 are individually similar to those of the foregoing example of FIG. 2 or FIG. 3. There is provided a corrected target driving force calculating means 70 for calculating a corrected target driving force Fta which changes in a more suppressed manner than that of the target driving force Ft calculated by the target driving force calculating means 52. Here will be later described the contents of the controls to be made by the corrected target driving force calculating means 70.

There is provided means 72 for calculating a target power Pta on the basis of the corrected target driving force Fta, as calculated by this corrected target driving force calculating means 70, and the vehicle speed V. The corrected target driving force Fta or the basic data for the calculations, as performed here, changes with a suppression in relation to the change in the target driving force Ft according to the accelerator opening Acc or one example of the acceleration demand. Therefore, the calculation value is the corrected target power Pta exhibiting the suppressed change relative to the target power Pt, as obtained in the target power calculating means 54, so that the calculating means 72 corresponds to the corrected target power calculating means 72.

There is further provided means 74 for calculating a target torque Ta of the engine 10 on the basis of the corrected target power Pta, as obtained by the corrected target power calculating means 72, and the engine speed Ne or the input shaft speed Nint. The corrected target power Pta or the basic data for the calculations, as performed here, changes with a suppression in relation to the target power Pt calculated by the target power calculating means 54. Therefore, the calculation value is the corrected target torque Ta so that the calculating means 74 corresponds to the corrected target torque calculating means 74. An instruction signal corresponding to the corrected target torque Ta thus obtained is inputted to the engine load control means 66 so that the load (e.g., the throttle opening or the fuel supply) on the engine 10 is controlled to achieve the corrected target torque Ta. There is further provided feedback means 76 for feeding a feedback signal of the engine torque from the engine load control means 66 to the corrected target driving force calculating means 70.

Figure 9:
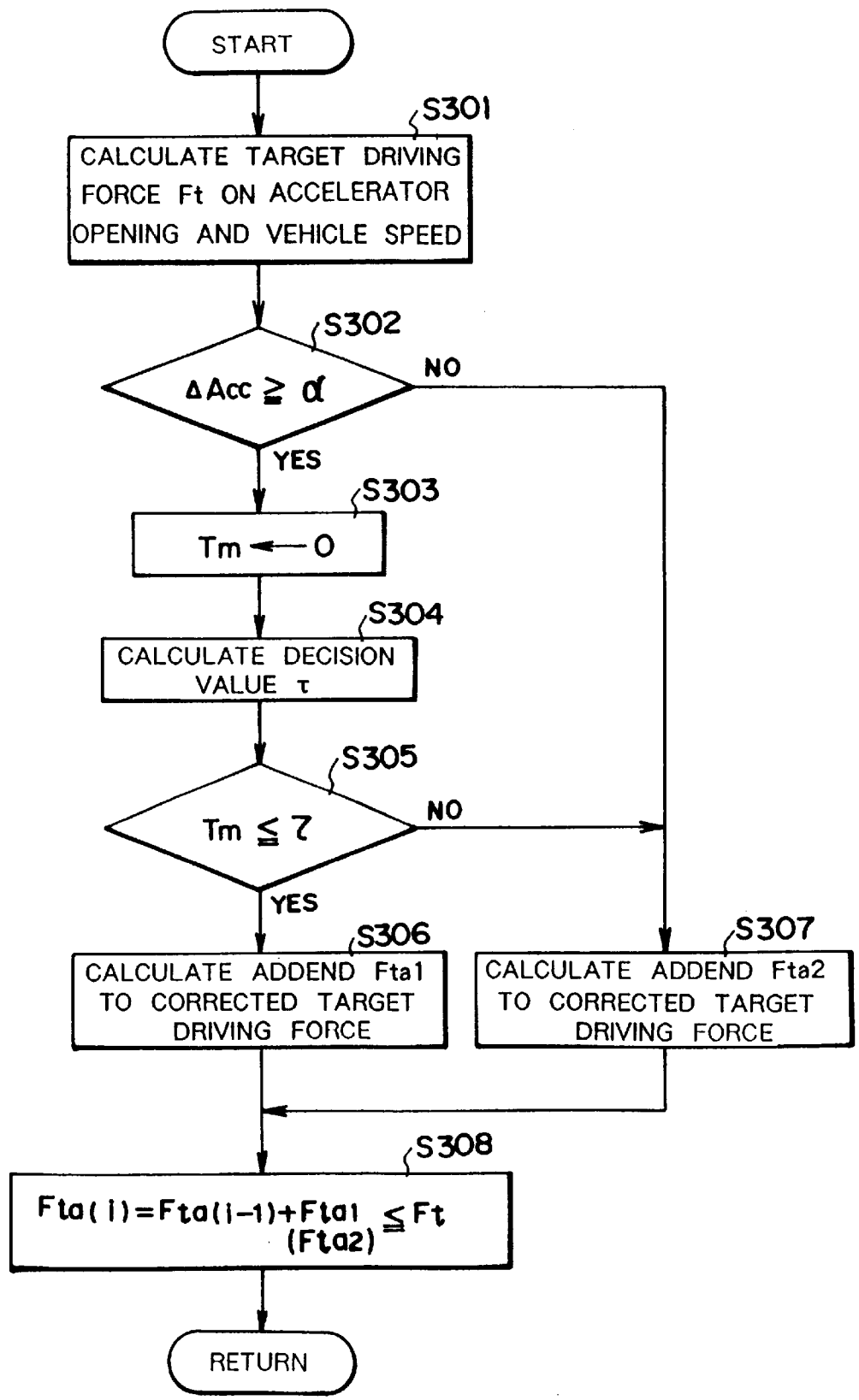
FIG. 9 is a flow chart for explaining a control example to be executed in the embodiment shown in FIG. 8.

In the control system having the aforementioned means shown in FIG. 8, according to the invention, the control shown in FIG. 9 is executed mainly by the corrected target driving force calculating means 70 to calculate the corrected target driving force Fta, on which the corrected target torque Ta is determined. On the basis of this corrected target torque Ta, the load control of the engine 10 is executed till the driving force of the vehicle reaches the final target driving force Ft. In FIG. 9, the target driving force Ft is calculated at first (at Step S301). This Step is executed by the target driving force calculating means 52 so that the target driving force Ft is determined on the basis of the accelerator opening Acc and the vehicle speed V. Here, the accelerator opening Acc is the control data which are obtained by processing the depression stroke of the accelerator pedal electrically and which are adopted as the control parameter indicating a demand for an acceleration or deceleration, i.e., a demand for the driving force. Therefore, the signal of the acceleration demand for the cruise control to keep the vehicle speed at a predetermined value can be adopted as the parameter in place of the accelerator opening Acc. This replacement can be applied to the vehicle speed, too. The speed of another suitable rotary member having a one-to-one relation to the vehicle speed V can also be adopted as the control parameter in place of a value relating to the vehicle speed V.

Next, it is decided (at Step S302) whether or not a change $\Delta$Acc of the accelerator opening Acc for a unit time is more than a predetermined reference value $\alpha$ (e.g., 0.5 deg./16 ms.). This corresponds to a step of deciding whether or not it is in an abrupt acceleration state in which the acceleration demand abruptly augments, and this step can be performed by comparing the time-differentiation of the acceleration demand signal, as inputted to the ECU 30, with a reference value.

Figure 10:
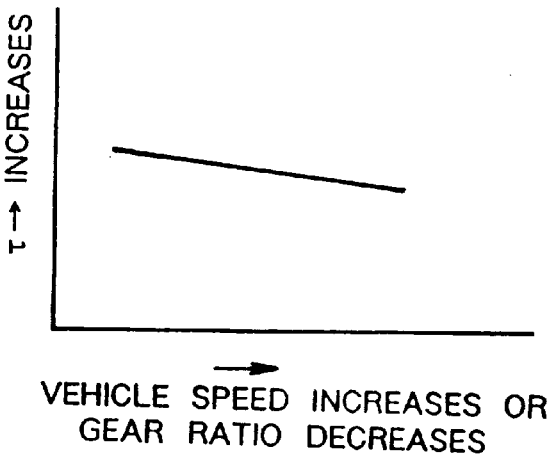
FIG. 10 is a diagram illustrating one example of a map of a decision value of a time period to be counted in the control example.

When the accelerator pedal is abruptly depressed so that the answer of Step S302 is YES, a start is made by resetting a timer Tm to zero (at Step S303). Next, there is determined (at Step S304) a reference value $\tau$ of the time to be counted by the timer Tm, that is, the elapsed time after the accelerator pedal was deeply depressed. This reference value $\tau$ increases/decreases according to the vehicle speed V or the gear ratio, and relates to a delay time until the intake air according to this opening is reached after the throttle opening was changed (or augmented). Moreover, this reference value $\tau$ may be read out from the map, which is prepared in advance by using the vehicle speed V or the gear ratio as the parameter. This map is exemplified in FIG. 10. As illustrated in FIG. 10, the reference value $\tau$ is so set that it is the smaller for the higher vehicle speed or the lower gear ratio.

Figure 11:
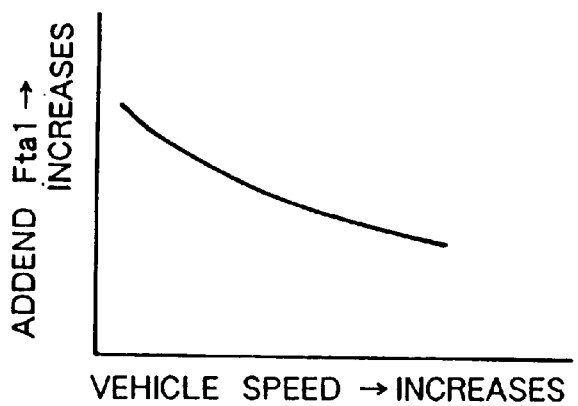
FIG. 11 is a diagram conceptionally illustrating one example of a map of a first addend for calculating a corrected target driving force in the control example.

At subsequent Step S305, it is decided whether or not the counted value of the timer Tm is less than the reference value $\tau$. In other words, it is decided whether or not the elapsed time after an abrupt increase in the accelerator opening was decided has failed to reach the reference value $\tau$. When the answer of this Step S305 is affirmative, the state is just after the accelerator pedal was abruptly depressed to augment the throttle opening and is exemplified by the state in which the intake air is not sufficiently augmented yet or in which the increase in the engine output according to the increase in the throttle opening is not surely started. In this case, there is adopted (at Step S306) a first addend Fta1 for determining the changing degree (or the changing gradient) of the corrected target driving force Fta. The addend Fta1 is an increase in the corrected target driving force Fta for each cycle tyme to execute the control based on the flow chart shown in FIG. 9. As this addend Fta1, there is adopted the value which has been prepared in advance as a one-dimensional map using the vehicle speed V illustrated in FIG. 11, as the parameter.

Figure 12:
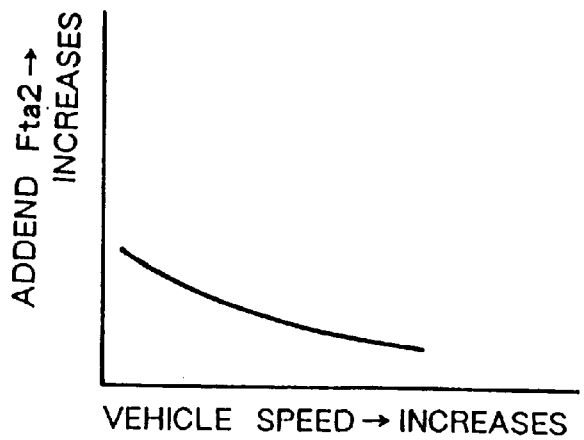
FIG. 12 is a diagram conceptionally illustrating one example of a map of a second addend for calculating a corrected target driving force in the control example.

When the answer of Step S305 is negative, that is, when the counted value of the timer Tm exceeds the reference value $\tau$, on the contrary, the intake air to the engine 10 begins to augment to a quantity according to the throttle opening, or the engine output begins to augment to an output according to the throttle opening. In this case, therefore, a second addend Fta2 smaller than the aforementioned value Fta1 is adopted (at Step S307) as the addend for determining the changing degree (or the changing gradient) of the corrected target driving force Fta. The addend Fta2 is an increase in the corrected target driving force Fta for each cycle time to execute the control based on the flow chart shown in FIG. 9. As this addend Fta2, there is adopted the value which has been prepared in advance as a one-dimensional map using the vehicle speed V illustrated in FIG. 12, as the parameter.

These addents Fta1 and Fta2 are so set that they become the smaller for the higher vehicle speed and that the latter second addend Fta2 is smaller than the former first addend Fta1. The addends Fta1 and Fta2 thus determined are added to the immediately preceding (or previous) corrected target driving force Fta so that the corrected target driving force Fta gradually augments until it reaches the target driving force Ft (at Step S308). That is, the following calculations are continued till the target driving force Ft is reached:

$$Fta(i)=Fta(i-1)+Fta1 \text{ (or } Fta2) \leq Ft.$$

Here in the control example shown in FIG. 9, when the answer of Step S302 is negative because the change $\Delta Acc$ of the accelerator opening is smaller than the reference value $\alpha$, the routine advances to Step S307, at which the change in the corrected target driving force Fta is controlled to be gentle from the beginning.

Figure 13:
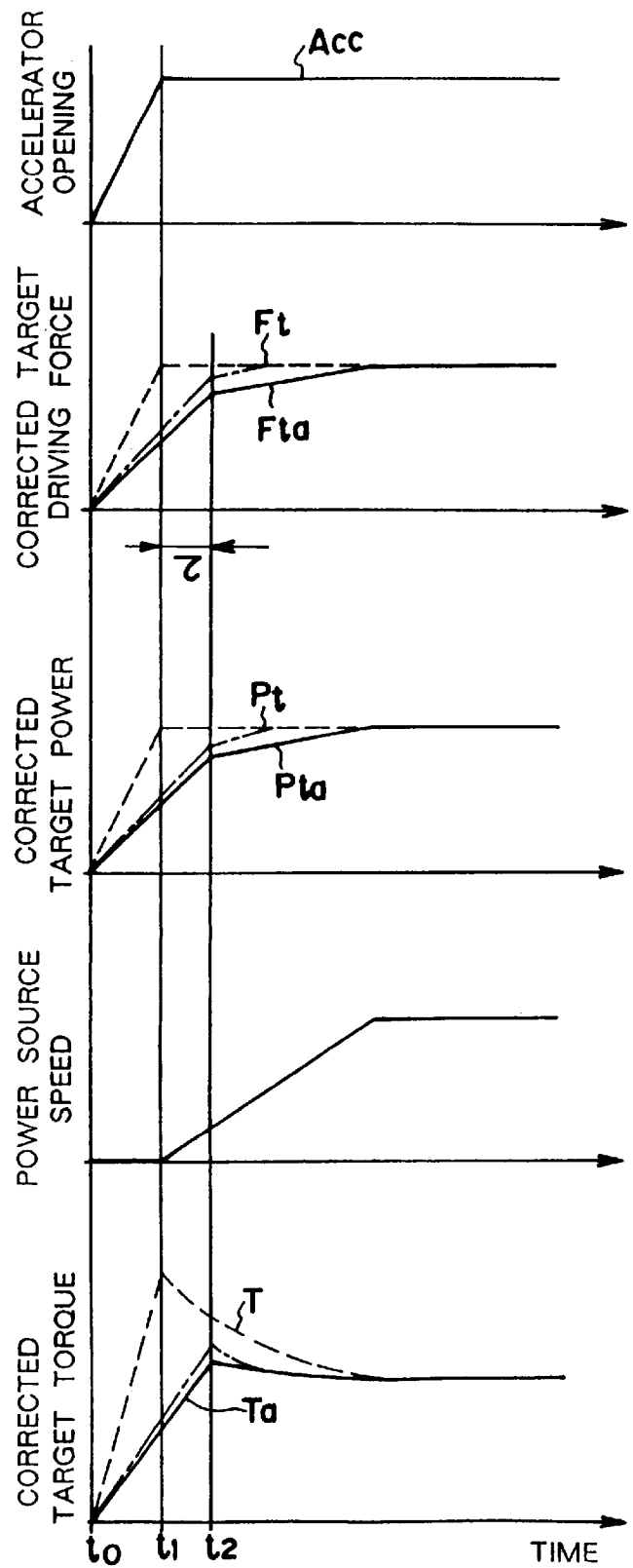
FIG. 13 is a time chart illustrating changes in a corrected target driving force, a corrected target power, a power source speed and a corrected target torque when the control shown in FIG. 9 is executed.

In the case of the control shown in FIG. 9, therefore, the corrected target driving force Fta has such a changing tendency in the course to the target driving force Ft that it once bends and gently changes, as illustrated in FIG. 13. If the accelerator pedal is deeply depressed at time t0 and if it is decided at time t1 that the changing rate per time is higher than the reference value, the corrected target driving force Fta is set from time t1 to time t2 after lapse of the reference value $\tau$ by adopting a lager value Fta1 as the addend of each cycle. This setting is illustrated by the solid lines in FIG. 13. This corrected target driving force Fta takes a target value which makes a suppressed change with respect to the uncorrected or unrounded target driving force Ft, i.e., the target driving force Ft (as indicated by broken lines in FIG. 13) which is obtained by the target driving force calculating means 52.

At and after time t2 when the reference value $\tau$ lapsed, the smaller addend Fta2 is adopted as the addend of the corrected target driving force Fta so that the change in the corrected target driving force Fta is further suppressed and made gentler. In other words, after lapse of the reference value $\tau$, the change in the corrected target driving force Ft is restricted more than before.

The corrected target power Pta is thus determined on the basis of the corrected target driving force Ft having the suppressed change so that it is indicated by the solid lines in FIG. 13. Specifically, the corrected target power Pta exhibits a suppressed change with respect to the target power Pt, as determined by the target power calculating means 54 and indicated by the broken lines, and bends once in the course of its change so that its change is further restricted on and after the bending point. Moreover, the corrected target torque Ta is determined on the basis of the corrected target power Pta so that it takes a smoothly changing target value without such an extreme overshoot as is indicated by the solid lines in FIG. 13.

Here, if the reference value $\tau$ is set at a value corresponding to the delay in the increase of the intake air with respect to the increase in the throttle opening, the peak value of the engine torque can be avoided from highly exceeding the target torque to prevent the acceleration shock more reliably. As illustrated in FIG. 13, on the other hand, the bending point of the corrected target driving force Fta, the bending point of the corrected target power Pta, and the peak value of the corrected target torque Ta occur at the same time t2. Therefore, the control to change the addend of the corrected target driving force Fta from Fta1 to Fta2 may be executed on the basis of the driving force or power without depending upon the timer Tm.

According to the control shown in FIG. 9, therefore, the individual corrected target values of the driving force, the power and the engine torque are given the relatively highly changing values at the beginning of the control and the relatively suppressed values after lapse of the predetermined period, so that their changes can be restricted at the instant when the engine output is to be increased after the start of the control by the delay in the intake air of the engine 10 or in the response of the output. As a result, the acceleration control at the start or the like can be performed without causing the excessive response delay of the engine 10, the abrupt increase in the actual engine torque or the deterioration of the fuel consumption.

Figure 14:
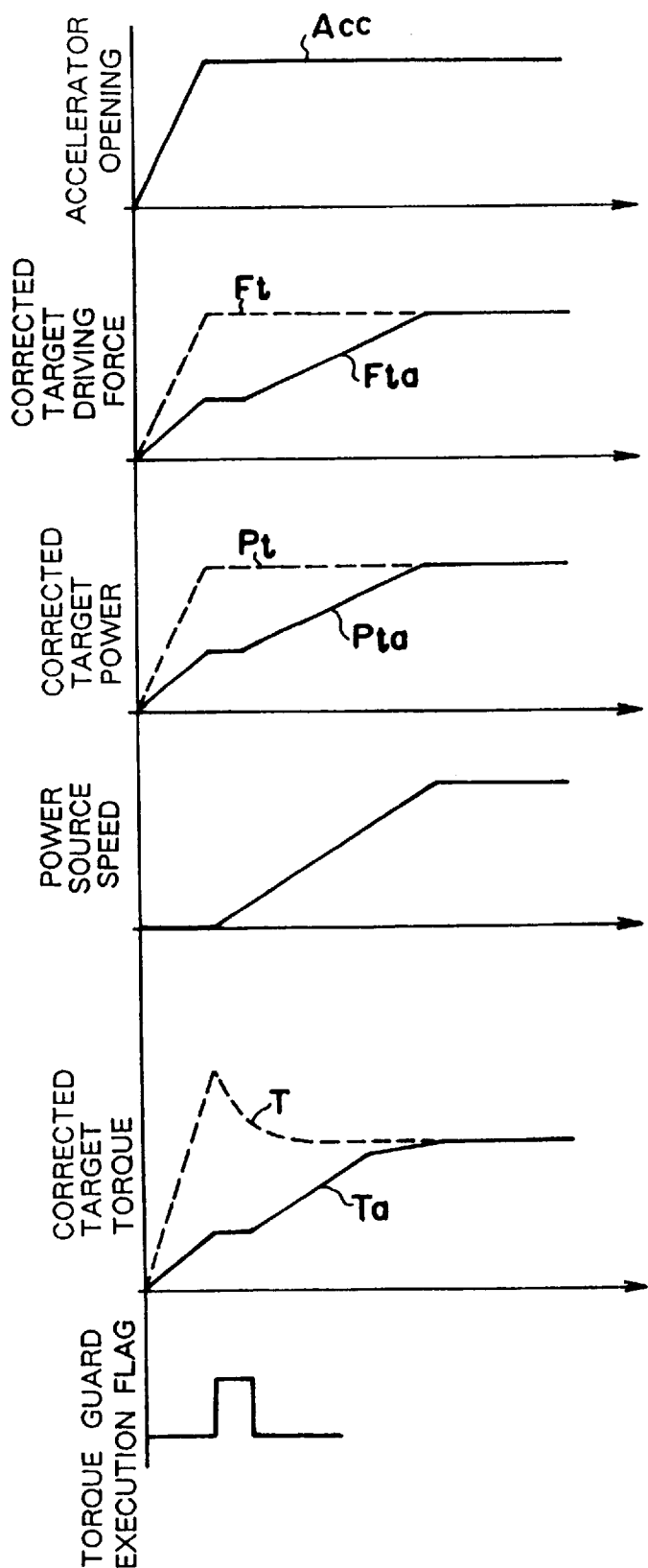
FIG. 14 is a time chart illustrating changes in a corrected target driving force, a corrected target power, a power source speed and a corrected target torque when a control for inhibiting the change in the corrected target driving force temporarily in the gear shift is made.

Here in the invention, the changing degrees of the individual corrected target values could be restricted not only so that the changes themselves may not be temporarily caused, but also so that the changes are suppressed in their course. The time chart of this modified control is illustrated in FIG. 14. In this control, more specifically, an intermediate value of the target torque is set in advance as a torque guard value, that is, a value as required for eliminating the backlash in the power transmission line from the power source to the drive wheels. The change in the target driving force, i.e., the first addend Fta1 is set to a large value till the engine torque reaches the torque guard value, and a torque guard execution flag is raised when the engine torque reaches the torque guard value. While this torque guard execution flag being is raised, the corrected target driving force is kept constant and is not changed. On the other hand, this period is controlled by a timer, and after lapse of a predetermined period, the torque guard execution flag is OFF to change the corrected target driving force Fta again. In this case, the backlash in the power transmission line is eliminated so that the output of the power source is transmitted as it is to the power transmission line. Therefore, the aforementioned addend Fta2 at the smaller value is adopted as the addend for changing the corrected target driving force Fta.

When the backlash of the power transmission line is not eliminated so that the power is not completely transmitted, the first addend Fta1 can be made larger, and the engine output or engine torque changes relatively abruptly to quicken the control. After the backlash is eliminated, the change in the engine output or engine torque is relatively loosened. As a result, the elastic torsional deformation in the power transmission line is suppressed while improving the response so that the longitudinal vibration (or the surging) of the vehicle is prevented.

Here will be described the relations between the invention and the foregoing specific examples and modifications. The rounded target driving force calculating means 60, the rounded target power calculating means 62 and the engine load calculating means 64, as shown in FIG. 2, and the corrected target driving force calculating means 70, the corrected target power calculating means 72 and the corrected target torque calculating means 74, as shown in FIG. 8, correspond to corrected target torque calculating means of the invention. The rounded target power calculating means 62 and the engine load calculating means 64, as shown in FIG. 3 correspond to the corrected target torque calculating means of the invention. On the other hand, the engine load calculating means 64 having an additional function to round the target torque corresponds to the corrected target torque calculating means of the invention. Moreover, the functional means for executing the controls of Step S305 to Step S308, as shown in FIG. 9, that is, the corrected target driving force calculating means 70, and the functional means for keeping the corrected target driving force Fta at a constant value temporarily in its changing course, as shown in FIG. 14, corresponds to the corrected target torque calculating means of the invention.

On the other hand, the functional means for executing Step S103 shown in FIG. 5 corresponds to the lower limit restricting means of the invention, and the functional means for executing Step S203 shown in FIG. 6 corresponds to the upper limit restricting means of the invention.

In order to prevent the shocks, as might otherwise accompany an abrupt increase in the target torque, the foregoing specific examples are constructed by rounding the target driving force, by restricting the engine speed or input speed to be used for calculating the target torque with the lower limit, and by predetermining the addends for determining the changing gradients of the target driving force, the target power and the target torque, as the map values considering the delay in the intake air and the backlash in the drive line. However, the invention could also be constructed to make additional corrections considering the inertia torque.

When the output demand (or the acceleration demand) is augmented to change a gear ratio by depressing the accelerator pedal, the speed of the rotary members constructing the power line including the engine 10 and the CVT 12 changes so that the inertia torque according to their angular accelerations and inertia moments acts in the direction to suppress their rotational changes. In order to compensate the loss due to that inertia torque thereby to output a torque according to the acceleration demand, therefore, the degree of suppression of the change in the target torque, as exemplified in the foregoing specific example, has to be reduced according to the inertial loss torque. In one example, a corrected value $\Delta F$ according to the inertial loss torque is added to the rounded value Fs of 1/n of the target driving force obtained by the rounded target driving force calculating means 60 shown in FIG. 2. The corrected value $\Delta F$ is predetermined on the basis of the control parameter indicating the running state of the vehicle such as the accelerator opening, i.e., the acceleration demand. Moreover, the corrected value $\Delta F$ is set at the larger value for the higher acceleration demand. Here, the corrected value $\Delta F$ may be made the larger for the higher changing rate of the accelerator opening.

The change in the target driving force when the corrected value $\Delta F$ is added is illustrated by a broken line in FIG. 2. On the basis of the corrected target driving force having the corrected value $\Delta F$ added thereto, the target power is calculated by the rounded target power calculating means 62, and the engine load such as the throttle opening is calculated by the engine load calculating means 64 on the basis of that target power. As a result, the target output torque calculated becomes larger by the addition of the corrected value $\Delta F$. In other words, the suppression degree of the change in the target output torque is reduced by adding the corrected value $\Delta F$. The corrected value $\Delta F$ is the larger for the higher acceleration demand or the changing rate of the acceleration demand so that the suppression degree of the change in the target output torque is the lower for the higher acceleration demand or the higher changing rate of the output demand.

Therefore, the functional means, that is, the rounded target driving force calculating means 60 having the additional function to add the corrected value $\Delta F$ according to the inertial loss torque, the rounded target power calculating means 62 for calculating the target power on the basis of the calculated value of the means 60, and engine load calculating means 64 correspond to the corrected target torque calculating means of the invention.

With these corrections, the target torque obtained is higher by the inertial loss torque accompanying the speed change, so that the rotational change can be quickly caused by minimizing the influence of the inertia force. As a result, the acceleration response is improved. On the other hand, the corrected value $\Delta F$ corresponding to the inertia torque, as used for correcting the target torque, does not contain variable factors such as the engine speed but takes a predetermined value, so that the target torque can be surely prevented from being fluctuated by the disturbances and accordingly from causing the longitudinal vibration (or the surging).

Here, the target torque, to which the aforementioned inertial loss torque is added, could also be corrected not by correcting the target driving force but by correcting the target power or the target torque. When the target power is to be rounded in the rounded target power calculating means 62 shown in FIG. 3, more specifically, the value, as predetermined according to the acceleration demand such as the accelerator opening or its changing rate, may be so added that the target power may augment according to the inertial torque. When the rounded target power calculating means 62 is thus constructed, this target power and the functional means of the engine load calculating means 64, as shown in FIG. 3, correspond to the corrected target torque calculating means of the invention. When the target engine torque T is to be rounded in the engine load calculating means 64, on the other hand, there may be added a value according to an inertia torque which is predetermined according to the acceleration demand such as the accelerator opening or its changing rate. When the engine load calculating means 64 is thus constructed, the functional means of the engine load calculating means 64 corresponds to the corrected target torque calculating means of the invention.

Figure 15:
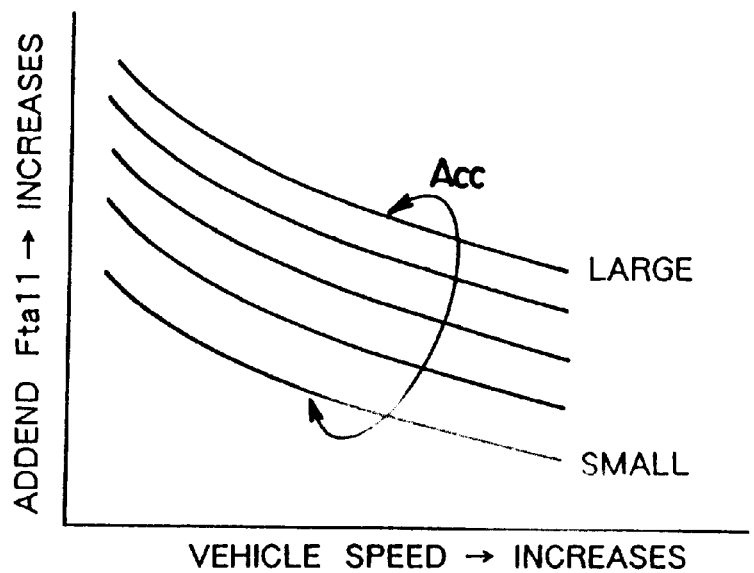
FIG. 15 is a diagram conceptionally illustrating one example of a map of a first addend, in which there is included an inertia torque for calculating the corrected target driving force to be used in the control example executed by the control system shown in FIG. 8.
Figure 16:
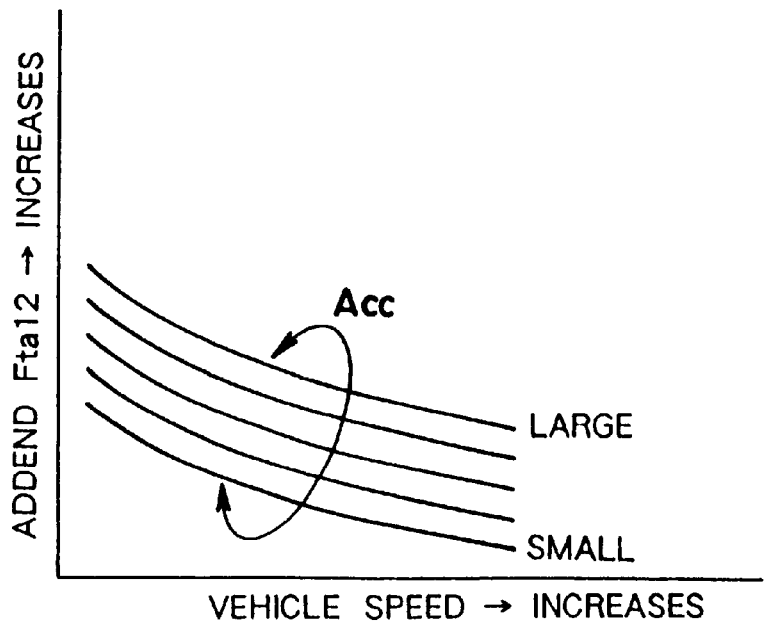
FIG. 16 is a diagram conceptionally illustrating one example of a map of a second addend, in which there is included an inertia torque for calculating the corrected target driving force to be used in the control example executed by the control system shown in FIG. 8.

Moreover, the correction of the target torque considering the aforementioned inertia torque could be incorporated into the control considering the delay in the increase of the intake air, as shown in FIG. 9, and the backlash in the power transmission line. Specifically, a map value Fta1 shown in FIG. 15 is adopted in place of the map value shown in FIG. 11, as the corrected target driving force addend to be calculated at Step S306 in FIG. 9, and a map value Fta12 shown in FIG. 16 is adopted in place of the map value shown in FIG. 12, as the corrected target driving force addend to be calculated at Step S307. More specifically, the corrected target driving force addends Fta11 and Fta12, as illustrated in FIGS. 15 and 16, consider the inertial torque accompanying the rotational change at the acceleration so that they are set to the larger values for the larger accelerator opening or the acceleration demand. Here, these values may be set to the larger values for the higher changing rate of the accelerator opening.

In addition to the aforementioned setting of the target driving force addends Fta11 and Fta12, the engine 10 and the CVT 12 are controlled, as shown in FIGS. 8 and 9. Therefore, the corrected target driving force, the corrected target power and the corrected target torque in the case, where the target torque is corrected by estimating the inertia torque, change, as additionally illustrated by single-dotted lines in FIG. 13. In short, the suppression degree of the change in the target torque is reduced.

In this control system, too, the output torque is augmented as promptly as possible within a range of deteriorating or causing no shock thereby to improve the acceleration response, and the predetermined value with no disturbance is adopted although the inertia torque is considered, so that the longitudinal vibration (or the surging) can be prevented. Therefore: the functional means of Steps S306 and S307, as constructed to calculate the target driving force addends Fta11 and Fta12 shown in FIGS. 15 and 16; the functional means of Step S308 for calculating the corrected target driving force on the basis of these addends; and the functional means of the calculating means 74 of FIG. 8 for calculating the target torque on the basis of the corrected target driving force correspond to the corrected target torque calculating means of the invention.

Here, the target driving force addends Fta11 and Fta12, as illustrated in FIGS. 15 and 16, could also be adopted in the control, as illustrated in FIG. 14, for stopping the changes in the individual corrected target values temporarily in the courses of the changes. In this modification, too, the actions obtained are similar to those of the foregoing examples. As described above, on the other hand, the target driving force, the target power and the target torque are calculated on the basis of the acceleration demand, as represented by the accelerator opening. In the correction adding the aforementioned inertia torque, therefore, the suppression degree of the change in the corrected target torque may be calculated not only according to the accelerator opening or its changing rate, but also according to another control parameter such as the target driving force or the target power, or its changing rate.

Here will be synthetically described advantages to be obtained from the invention. According to the invention, as has been described hereinbefore, the corrected target value having a gentler change than that of the target value determined on the basis of the output demand is set as the control data for the power source which has a better control response than that of the continuously variable transmission, so that the power source is controlled on the basis of the corrected target value. In the case of a demand for increasing the driving force, therefore, the power source and the continuously variable transmission can be controlled without any relative delay. As a result, the acceleration shock at the time of depressing the accelerator abruptly can be reduced while keeping the response of the continuously variable transmission proper, thereby to control the vehicle without any physical discomfort.

According to the invention, on the other hand, the restriction is made to loosen or temporarily stop the changing tendency of the corrected target torque in its changing course. Even for torque increase after the delay in the output increasing demand for the power source or after the response delay due to the backlash of the power transmission line, therefore, the control can be made to suppress the abrupt change in the torque increase. As a result, the so-called "acceleration shock" can be prevented, and the torsional deformation of the power transmission line can be suppressed to prevent the longitudinal vibration (or the surging).

According to the invention, moreover, the suppression degree of the change in the corrected target torque is so set as to compensate the torque loss corresponding to the inertia torque, as caused by the rotational change accompanying the acceleration demand, and is determined on the basis of the acceleration demand or the control parameter based thereon, or their changing rates. Therefore, no fluctuation is caused by the disturbances in the correction of the target torque for compensating the internal loss torque. As a result, it is possible to prevent the fluctuation of the output torque and the longitudinal vibration (or the surging) caused thereby. On the other hand, the suppression degree is made the lower for the higher inertial torque, that is, the changing ratio of the corrected target torque is made the higher as the acceleration demand, its based control parameter or their changing rates grow the higher. Therefore, the delay in the rotational change by the inertia force can be prevented to perform a shift having a high response.

According to the invention, moreover, when the target torque is to be calculated, a lower limit is set for the speed of the power source for the calculation. Therefore, the target driving force to be calculated at the start is avoided from becoming excessive. As a result, it is possible to prevent the excessive increase in the driving torque in the converter region and the abrupt acceleration feeling, as might otherwise be caused by the excessive increase of the driving torque.

According to the invention, moreover, an upper limit is set for the target torque so that the torque to be controlled is suppressed even if the calculated target torque is high. As a result, it is possible to prevent the excessive increase in the driving torque in the converter region and the abrupt acceleration feeling, as might otherwise be caused by the excessive increase of the driving torque.

What is claimed is:

1. A control system for a vehicle including a power source and a continuously variable transmission capable of changing gear ratios continuously, in which a target driving force is calculated on the basis of an acceleration demand and a vehicle speed, and a target power of the power source is calculated on the basis of the target driving force so that said continuously variable transmission may be controlled to achieve the target power, and in which a target torque of the power source is calculated on the basis of said target driving force so that said power source is controlled to achieve the target torque, comprising:

corrected target torque calculating means for determining a corrected target torque changing in the course to reach said target driving force, while being suppressed more than the change of said target torque;

gear ratio control means for controlling the gear ratio of said continuously variable transmission on the basis of said target power; and load control means for controlling the load on said power source on the basis of said corrected target torque.

2. A vehicular control system according to claim 1, wherein said corrected target torque calculating means includes means for determining a corrected target driving force changing while being suppressed more than the change of said target driving force, to calculate said corrected target torque on the basis of said corrected target driving force.

3. A vehicular control system according to claim 1, wherein said corrected target torque calculating means includes means for determining a corrected target power changing while being suppressed more than the change of said target power, to calculate said corrected target torque on the basis of said corrected target power.

4. A vehicular control system according to claim 1, wherein said corrected target torque calculating means includes means for calculating said corrected target torque on the basis of said target torque.

5. A vehicular control system according to claim 1, wherein said corrected target torque calculating means includes means for calculating said corrected target torque so that the change in said corrected target torque may be restricted for a predetermined period in the course of the change.

6. A vehicular control system according to claim 2, wherein said corrected target torque calculating means includes means for calculating said corrected target torque so that the change in said corrected target torque may be restricted for a predetermined period in the course of the change.

7. A vehicular control system according to claim 3, wherein said corrected target torque calculating means includes means for calculating said corrected target torque so that the change in said corrected target torque may be restricted for a predetermined period in the course of the change.

8. A vehicular control system according to claim 4, wherein said corrected target torque calculating means includes means for calculating said corrected target torque so that the change in said corrected target torque may be restricted for a predetermined period in the course of the change.

9. A vehicular control system according to claim 1, wherein said corrected target torque calculating means includes means for calculating said corrected target torque by making the suppression degree of the change in said corrected target torque the lower for the larger acceleration demand or the larger control parameter determined from said acceleration demand.

10. A vehicular control system according to claim 2, wherein said corrected target torque calculating means includes means for calculating said corrected target torque by making the suppression degree of the change in said corrected target torque the lower for the larger acceleration demand or the larger control parameter determined from said acceleration demand.

11. A vehicular control system according to claim 3, wherein said corrected target torque calculating means includes means for calculating said corrected target torque by making the suppression degree of the change in said corrected target torque the lower for the larger acceleration demand or the larger control parameter determined from said acceleration demand.

12. A vehicular control system according to claim 4, wherein said corrected target torque calculating means includes means for calculating said corrected target torque by making the suppression degree of the change in said corrected target torque the lower for the larger acceleration demand or the larger control parameter determined from said acceleration demand.

13. A vehicular control system according to claim 5, wherein said corrected target torque calculating means includes means for calculating said corrected target torque by making the suppression degree of the change in said corrected target torque the lower for the larger acceleration demand or the larger control parameter determined from said acceleration demand.

14. A vehicular control system according to claim 1, wherein said corrected target torque calculating means includes means for calculating said corrected target torque by making the suppression degree of the change in said corrected target torque the lower for the higher changing rate of said acceleration demand or the higher changing rate of a control parameter determined from said acceleration demand.

15. A vehicular control system according to claim 2, wherein said corrected target torque calculating means includes means for calculating said corrected target torque by making the suppression degree of the change in said corrected target torque the lower for the higher changing rate of said acceleration demand or the higher changing rate of a control parameter determined from said acceleration demand.

16. A vehicular control system according to claim 3, wherein said corrected target torque calculating means includes means for calculating said corrected target torque by making the suppression degree of the change in said corrected target torque the lower for the higher changing rate of said acceleration demand or the higher changing rate of a control parameter determined from said acceleration demand.

17. A vehicular control system according to claim 4, wherein said corrected target torque calculating means includes means for calculating said corrected target torque by making the suppression degree of the change in said corrected target torque the lower for the higher changing rate of said acceleration demand or the higher changing rate of a control parameter determined from said acceleration demand.

18. A vehicular control system according to claim 5, wherein said corrected target torque calculating means includes means for calculating said corrected target torque by making the suppression degree of the change in said corrected target torque the lower for the higher changing rate of said acceleration demand or the higher changing rate of a control parameter determined from said acceleration demand.

19. A control system for a vehicle including a power source and a continuously variable transmission having a torque converter capable of changing gear ratios continuously, in which a target driving force is calculated on the basis of an acceleration demand and a vehicle speed, and a target power of the power source is calculated on the basis of the target driving force, so that said continuously variable transmission may be controlled to achieve the target power, and in which a target torque of the power source is calculated on the basis of said target driving force and the speed of said power source so that said power source is controlled to achieve the target torque, comprising:

lower limit restricting means for restricting a calculation speed of said target torque to a predetermined lower limit, at least in a portion of a converter region in which said torque converter amplifies the torque; and target torque calculating means for calculating said target torque on the basis of the calculation speed restricted to the predetermined lower limit.

20. A control system for a vehicle including a power source and a continuously variable transmission having a torque converter capable of changing gear ratios continuously, in which a target driving force is calculated on the basis of an acceleration demand and a vehicle speed, and a target power of the power source is calculated on the basis of the target driving force, so that said continuously variable transmission may be controlled to achieve the target power, and in which a target torque of the power source is calculated on the basis of said target driving force and the speed of said power source so that said power source is controlled to achieve the target torque, comprising:

upper limit restricting means for restricting said target torque to a predetermined upper limit according to an output demand, at least in a portion of a converter region in which said torque converter amplifies the torque; and load control means for controlling a load on said power source on the basis of said target torque restricted to the predetermined upper limit.

* * * * *